United States Patent Office

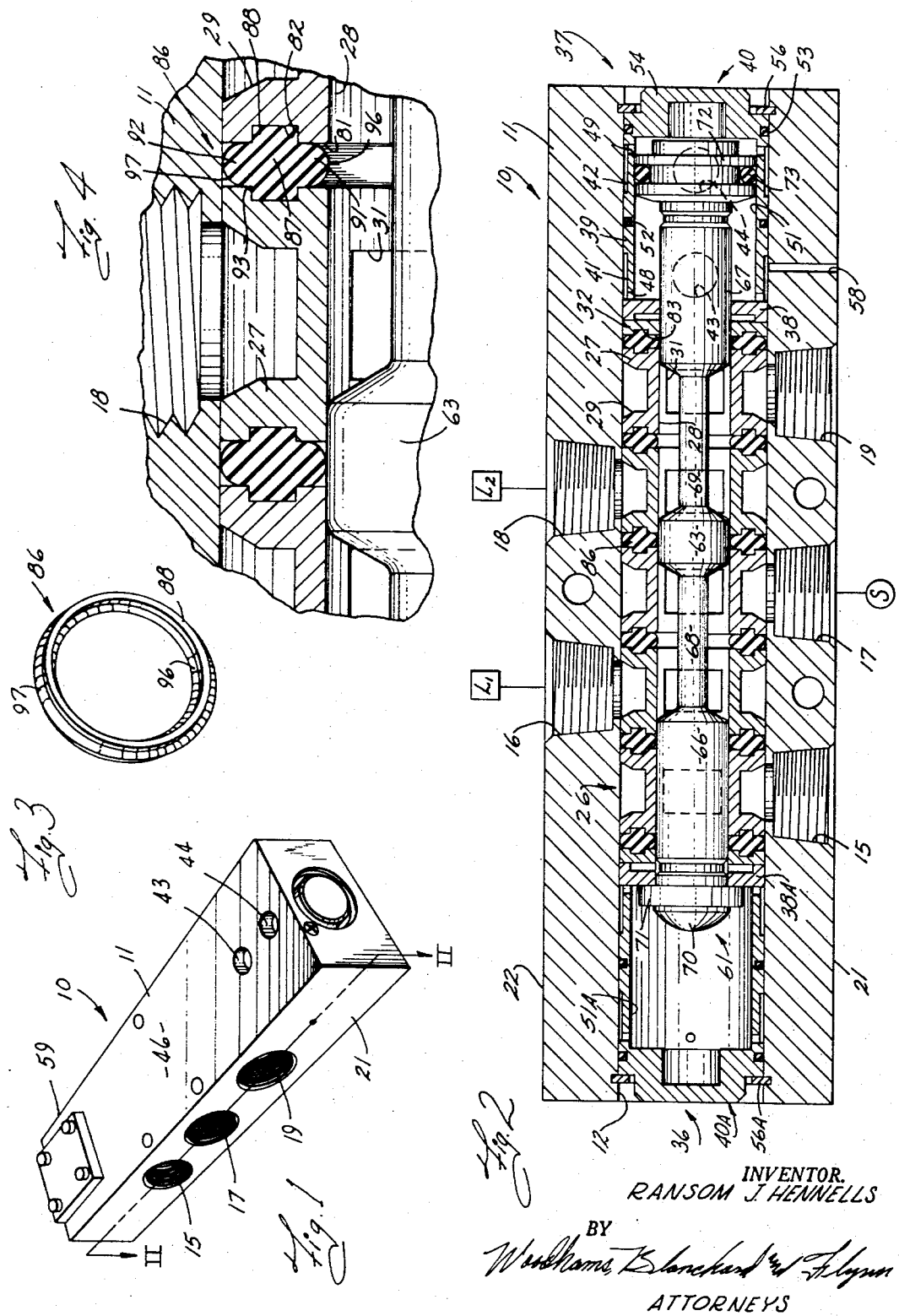

3,418,002
Patented Dec. 24, 1968

3,418,002
SEAL RING CONSTRUCTION
Ransom J. Hennells, Plymouth, Mich., assignor to W. E. Hennells Co., Inc., Belleville, Mich., a corporation of Michigan
Filed Dec. 27, 1965, Ser. No. 516,542
5 Claims. (Cl. 277—188)

ABSTRACT OF THE DISCLOSURE

A seal ring construction for a reciprocating core valve having a segmented liner, the seal ring having a substantially rectangular central portion with the axial ends thereof being snugly received within rectangular grooves formed in the adjacent axial end faces of the liner segments. The seal ring also has integral inner and outer portions extending radially from the central portion, the inner and outer portions having rounded ends thereon adapted to sealingly engage the periphery of the valve core and the valve housing, respectively.

---

This invention relates to a seal ring construction and more particularly relates to a seal ring construction for a reciprocating core valve having a segmented liner.

Sliding core valves are known in which a liner is disposed between the sliding core and valve housing. In such valves, movement of the core may cause frictional wear on the liner but does not harm the housing of the valve. As a result, after a period of use resulting in a substantial amount of wear, the liner is replaceable to renew the valve.

Where the valve has a plurality of ports, it has been found advantageous under certain circumstances to utilize a segmented or multipart liner in place of a single monolithic liner. Relatively deep annular grooves are generally provided in the periphery of the annular liner segments to allow communication between radial openings in the liner segments leading to the interior thereof and corresponding ones of the ports in the housing. Such previous liner segments have thus generally been of substantial radial thickness to allow for grooves of the required depth.

In such cases, there has been in the past a problem of providing sealing between the liner segments to prevent radial leakage therebetween as well as to provide axial isolation between liner segments in communication with different ports in the valve housing and different parts of the valve core. In some prior valve constructions, a single, relatively large O-ring has been employed between each pair of liner segments. However, in order to sealingly engage both the housing and the core, the radial cross section of the O-ring must exceed that of the liner segments. Thus, in view of the relatively large radial thickness of the liner segment, the O-ring may be required to be larger in cross section than is practical.

As a reaction to this problem, other prior valve constructions have utilized concentric inner and outer O-rings of relatively small cross section between each liner segment pair, the inner O-ring being capable of sealing against the core and the outer O-ring being capable of sealing against the housing. However, such an arrangement poses a substantial assembly problem.

Accordingly, the objects of this invention include:

(1) To provide a seal ring construction for disposition between liner segments of a reciprocating core valve.

(2) To provide a seal ring construction, as aforesaid, for disposition between the ends of an adjacent pair of liner segments which will prevent radial leakage between said liner segments, which will provide a seal between the liner and the reciprocable core to limit axial fluid flow therealong and which will provide a seal between the liner and the surrounding wall of the housing to limit axial fluid flow therealong.

(3) To provide a segmented liner construction for a reciprocating core valve incorporating a seal, as aforesaid, between each pair of liner segments.

(4) To provide a liner construction, as aforesaid, in which the seal is firmly held in position between the liner segments, in which the pressure exerted thereon by the liner segments is sufficient to hold same in position without deforming same substantially into the core opening of the liner, and in which the adjacent axially facing portions of the seal ring and liner segment are contoured to provide a mechanical interlock therebetween.

(5) To provide a liner construction, as aforesaid, which allows for easy assembly of the valve and which requires only one seal ring between each pair of liner segments.

(6) To provide a seal ring construction, as aforesaid, which is of sufficient radial thickness as to extend radially inwardly and outwardly beyond the end of the liner segments to snugly engage the wall of the opening in the housing and the core.

(7) To provide a sealing ring and liner construction, as aforesaid, which is relatively inexpensive to manufacture, which is readily adapted for use in existing lined valves, which is easily maintained and which will require little or no maintenance over a long service life under harsh conditions of use.

Other objects and purposes of this invention will be apparent to persons acquainted with apparatus of this general type upon reading the following specification and inspecting the accompanying drawings.

In the drawings:

FIGURE 1 is an oblique view of a valve embodying the invention.

FIGURE 2 is an enlarged central cross-sectional view substantially as taken on the line II—II of FIGURE 1.

FIGURE 3 is an enlarged oblique view of one of the sealing rings of FIGURE 2.

FIGURE 4 is an enlarged fragment of FIGURE 2.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

General description

In general, the objects and purposes of this invention are met by providing a segmented liner construction for disposition between the core and chamber wall of a reciprocating core valve. The liner construction includes a plurality of axially extending liner segments which are coaxially received within the chamber of the valve housing. Each of the segments has a substantially radial end wall which in turn has an annular groove of substantially rectangular cross section therein. A one-piece resilient sealing ring is disposed between the ends of each adjacent pair of liner segments and has an axially extending generally rectangular central portion, the ends of which are snugly seated within and fill the opposed annular grooves in the adjacent segments. The sealing ring further includes opposed inner and outer portions which extend radially from the central portion into engagement with the core and chamber wall, respectively. The inner and outer portions are firmly engaged axially by the end walls of the liner segments as are the central portions by the radial walls of the grooves. The ends of the inner and outer portions are rounded and located in spaced relation to the central portion therebetween.

*Detailed description*

The valve 10 (FIGURES 1 and 2) has a substantially rectangular housing 11. The housing 11 has a generally cylindrical central opening or chamber 12 which extends through the length thereof. Preferably evenly, axially spaced openings 15, 16, 17, 18 and 19 extend radially from the central opening 12 through the periphery of the housing 11. In the particular embodiment shown, the openings 15, 17 and 19 open through one side wall 21 of the housing 11 and the remaining openings 16 and 18 open through the opposite side wall 22. The openings 15–19 are here internally threaded. The openings 15–19 permit the valve 10 to be connected into fluid circuitry in any of a number of ways to exercise control thereover. In the particular embodiment shown, for example, the openings 16 and 18 connect to suitable fluid energized loads $L_1$ and $L_2$ while the openings 15 and 19 are used to exhaust connections and may be connected to suitable reservoirs or, in the case of air, to the atmosphere. The opening 17 connects to a source S of fluid under pressure. Although the use with elastic fluids, most commonly air, it is contemplated that such may be used with an inelastic fluid as well. The valve 10 includes a liner construction generally indicated at 26 which comprises a plurality, here five, of preferably identical and coaxially aligned segments 27. Each of the segments 27 is provided with a cylindrical central opening 28 and an annular groove 29 of substantially rectangular cross section located preferably midway between the ends thereof. Each of the segments 27 is centered on a respective one of the holes 15–19 with the groove 29 thereof in communication with such opening. Moreover, each of the segments 27 includes a radial opening 31 which communicates between the groove 29 and central opening 28 thereof for allowing communication of the respective one of the openings 15–19 with the central opening 28.

The liner construction 26 further includes an annular end member 32 at each end thereof. The liner construction 26 thus far discussed is substantially conventional in nature. Further details of the liner construction 26, departing from conventional practice and more closely concerned with the present invention, are discussed hereinafter.

The liner construction 26 is held in position with the central opening 12 of the housing 11 by retainer structures 36 and 37 (FIGURE 2). The retainer structures 36 and 37 are preferably identical and, hence, only one thereof, here the retainer structure 37 need be discussed, the description thereof applying to the retainer structure 36 as well. Further, parts of the retainer construction 36 corresponding to parts of the retainer construction 37 will be referred to by the same reference numerals thereas with the suffix A added thereto. The retainer structure 37 may be of any convenient construction and for purposes of illustration in the present embodiment utilizes an annular keeper 38 which bears against the end members 32 of the liner structure 26. A cap 40 is snugly disposed within the central opening 12. The cap 40 is generally cupshaped and has an inwardly axially extending hollow skirt 39 which abuts the outer end of the keeper 38. The skirt 39 has a spaced pair of annular grooves 41 and 42 which communicate with respective holes 43 and 44 through the top wall 46 (FIGURE 1) of the housing 11. The positions of the openings 43 and 44 are indicated in broken lines in FIGURE 2. The grooves 41 and 42 communicate through openings 48 and 49 with the opposite ends of the central recess 51 of the cap 40. A small restrictive orifice 58 is provided between the leftward groove 41 and the wall 21 of the housing 11 to permit fluid to be exhausted from the leftward side of the cap 40. An O-ring 52 is disposed between the grooves 41 and 42 to prevent leakage therebetween and a further O-ring 53 is disposed at the rightward end of the groove 42 to prevent leakage of fluid therewithin outwardly through the central opening 12. The cap 40 has a closed axially outer end 54 which in the particular embodiment shown is held within the end of the housing 11 by a snap ring 56.

A cover plate 59 is, in the particular embodiment shown, removably affixed to the leftward end of the top wall of the housing 11 to seal openings therein corresponding to the openings 43 and 44 at the rightward end thereof.

A valve core 61 extends through and beyond the central opening of the liner construction 26 for axial reciprocation with respect thereto. The value core 61 includes an intermediate spool 63 which is spaced between a pair of end spools 66 and 67 by coaxial connecting stems 68 and 69 of reduced diameter. The spools 63, 66 and 67 are snugly but slideably arranged within the central opening 28 of the liner construction 26. The intermediate spool 63 is relatively narrow and can be located between adjacent pairs of radial openings 31 without blocking same. The intermediate spool 63 is spaced from the end spools 66 and 67 sufficiently as to allow exposure of an adjacent pair of openings 31 therebetween.

A screw 70 threadedly engages the leftward end of the core 61 and retains a radially extended stop ring 71 thereon. The stop ring 71 lies loosely within the recess 51A of the cap 40A and limits rightward movement of the core 61 by interference with the keeper 38A.

The rightward end of the valve care 61 is equipped with a piston head 72 which fits snugly but slideably within the recess 51 and is equipped with an O-ring 73 for preventing fluid leakage axially therepast. Thus, pressure fluid entering the opening 44 is transferred through the groove 42 and opening 49 to the rightward side of the head 72 to urge the valve core 61 leftwardly from its position shown in the drawing to a position wherein the head 72 abuts the keeper 38. Conversely, pressure fluid entering the opening 43 passing through the groove 41 and opening 48 acts on the leftward face of the head 72 to urge the core 61 rightwardly to its rightwardmost position shown in FIGURE 2. The spools 63, 66 and 67, of the core 61, when in the shown rightwardmost position, connect the load port 16 to the source port 17 and connect the load port 18 to the exhaust port 19, the exhaust port 15 being closed. Conversely, in the leftwardmost position of the core 61, the ports 15 and 16 are connected, the ports 17 and 18 are connected and the port 19 is sealed. Turning now to the portion of the valve 10 more directly concerned with the present invention, and referring particularly to FIGURES 2, 3 and 4, the liner segments 27 are each provided with substantially radial end walls 81. A relatively shallow, axially opening annular groove 82 is preferably of rectangular cross section and is preferably radially centered in each of the radial end walls 81. The end members 32 are provided with substantially radial inner faces having preferably rectangular grooves 83 similar to the grooves 82.

A preferably monolithic seal ring 86 is provided between each pair of liner segments 27. Similarly, further seal rings 86 are disposed between the endmost segments 27 and the annular end members 32. The seal rings 86 are preferably identical and are preferably constructed of a resilient material of the type customarily used in sealing rings of various kinds such as neoprene, rubber or the like. The seal rings 86 each have a substantially rectangular central portion 87 which is elongated axially of the seal ring. The preferably rectangular ends 88 of the central portion 87 are arranged to fit snugly within the rectangular grooven 82 and 83. The seal ring 86 further includes radially opposed and radially extended inner and outer portions 91 and 92 which are axially centered on the central portion 87. In the particular embodiment shown, the radial extent of the inner and outer portions 91 and 92 is equal and somewhat less than the radial extent of the central portion 87 but greater than the axial extent of the ends 88. The inner and outer portions 91 and 92 have radially extended side walls 93 adjacent the central portion 87 which are firmly and continuously engaged by the radial portions of the end walls 81 of the adjacent liner segments 27. The radial ends of the inner and outer portions 91 and 92 are preferably hemicircular in cross section to provide rounded sealing surfaces 96 and 97, respectively. The seal surfaces 96 and 97 extend slightly beyond the radial extremes of the liner segments 27 for firmly contacting the periphery of the adjacent spools of the core 61 and the wall of the central opening 12 of the housing 11.

*Operation*

The operation of the valve 10 as a whole has been discussed hereinabove and in believed to require no further discussion. Thus, the following discussion is confined to the operation of the liner construction 26 including the seal rings 86 and with respect to the core 61 and housing 11.

The valve 10 may be readily disassembled by removal of the snap rings 56 and 56A which allows removal of the caps 40 and 40A. The core 61 and liner 26 may then be removed from the housing 11 as a unit, if desired. Thereafter, removal of the screw 70 and annular stop 71 cause the core 61 to be removed rightwardly from the liner 26 and, thereafter, the liner may be readily disassembled into its component parts simply by axial separation thereof.

The valve 10 may be assembled by a simple reversal of the above procedure although it will be seen that a number of other methods may be used. Reassembly of the core 61 and liner 26 as a unit outside the housing 11 is made substantially easier by the self-centering interlocking of the seal rings 86 and liner segments 27 made possible by the rectangular end portions 88 and grooves 82 thereof, such interlocking maintaining the liner segments 27 and seal rings 86 coaxially positioned for as long as they are prevented from axial separation.

Alternatively, the liner 26 may be assembled within the valve opening 12 after placement of the cap 40 and valve core 61, with the screw 70 and annular stop 71 removed therefrom, within the opening 12. Thereafter, the keeper 38 and end member 32 and succeeding seal rings 86 and liner segments 27 may be inserted into the leftward end of the opening 12 and over the core 61, each succeeding member inserted moving the previous ones rightwardly toward the limiting position thereof determined by the cap 40. After all of the proper elements have been strung on the core 61, the screw 70 my be inserted and tightened to hold the stop 71 in place and the cap 40A may be installed to complete assembly of the valve 10.

In the assembled valve 10, the segments 27 and end members 32 are firmly urged against the seal rings 86 therebetween to prevent radial fluid flow past the seal rings 86. Further, the rounded sealing surface 97 of each seal ring 86 is continuously and firmly pressed outwardly against the wall of the opening 12 in the housing to prevent axial fluid flow therebetween. Hence, fluid flow between the liner 26 and housing 11 is prevented between and beyond the openings 15–19. The inner sealing surface 96 of each seal ring 86 preferably extends slightly inwardly beyond the segments 27 surrounding same so that when one of the spools 63, 66 and 67 is moved to a position radially opposed thereto, the seal surface 96 bears firmly and continuously through its circumference upon the periphery of the spool to prevent axial fluid flow along the spool past such seal ring. As a result, the seal rings 86 prevent fluid flow past or along the spools 63, 66 and 67 while the valve core 61 is in either of its limiting positions.

In view of the interlock provided by insertion of the ends 88 on the seal rings 86 in the grooves 82 in the segments 27 and end members 32, the seal rings are positively retained in a position coaxial with respect to the segments 27 as long as the adjacent segments 27 are maintained in axial contact therewith. Thus, only a relatively small axial pressure need be exerted by the caps 40 and 40A, sufficient to prevent axial shifting of the intermediate parts. Thus, excessive axial pressures need not be exerted on the seal rings 86 to hold same in place with respect to the liner segments and, as a result, there is no danger of excessive axial compression of the seal rings and, hence, there is no danger of forcing an excessive amount of the end 96 into the core opening 28 which might interfere with reciprocation of the core or damage to the extended sealing part.

The embodiments of the invention in which an exclusive property or privilege is claimed are defined as follows:

1. In a segmented liner construction for disposition between the valve core and chamber wall of a reciprocating core valve housing, the combination comprising:

a plurality of axial liner segments snugly and coaxially receivable within the chamber of the valve housing, each of said segments having radial end walls, said end walls each having an annular groove of generally rectangular cross section substantially centrally positioned therein;

a one-piece compressible sealing ring made entirely of resilient material and having an axially extending, generally rectangular central portion, the axial ends of said central portion being snugly seated within and filling the annular grooves in the adjacent segment end walls, said sealing ring further including inner and outer portions which are integral with and extend radially from the central portion, said inner and outer portions being of less axial extent than said central portion, said inner and outer portions being snugly axially engaged on opposite axial sides thereof by said end walls of said adjacent liner segments radially inwardly and radially outwardly, respectively, from said grooves, the surfaces of said inner and outer portions remote from the central portion being rounded and extending somewhat beyond the inner periphery and the outer periphery of said liner segments for sealing engagement against the periphery of the valve core and the chamber wall, respectively.

2. In a segmented liner construction for disposition between the valve core and chamber wall of a reciprocating core valve housing, the combination comprising:

a plurality of axially arranged liner segments snugly and coaxially receivable within the chamber of the valve housing, said segments having recesses in the end walls thereof;

a solid one-piece compressible sealing ring made entirely of resilient material and having a central portion whose axial ends are snugly seated within and fill the recesses in the end walls of adjacent segments, said sealing ring further including inner and outer portions which are integral with and extend radially inwardly and outwardly, respectively, from said central portion, said inner and outer portions being of less axial extent than said central portion, said inner and outer portions being snugly axially engaged on opposite axial sides thereof by said end walls of said adjacent liner segments radially inwardly and radially outwardly, respectively, from said recesses, the surfaces of said inner and outer portions remote from the central portion extending somewhat beyond the inner periphery and the outer periphery of the liner segments for sealing engagement against the valve core and the chamber wall, respectively.

3. The device defined in claim 2, wherein the recesses formed in the end walls of said segments are substantially rectangular in cross section and wherein the central portion of said sealing ring is substantially rectangular in cross section.

4. The device defined in claim 2, wherein the inner and outer portions of said sealing ring remote from said central portion are rounded for sealing against the valve core and the chamber wall, respectively, for preventing axial fluid flow therepast.

5. The device defined in claim 2, wherein said segments have substantially radial end walls relative to said valve core, and wherein the axial thickness of said inner and outer portions of said sealing ring are substantially equal such that said inner and outer portions are snugly axially engaged on opposite axial sides thereof by said adjacent radial end walls.

References Cited

UNITED STATES PATENTS

| | | | |
|---|---|---|---|
| 2,392,182 | 1/1946 | Payne | 277—206 X |
| 2,452,832 | 11/1948 | Carter | 277—178 |
| 3,199,540 | 8/1965 | Forster | 277—198 X |
| 3,253,617 | 5/1966 | Beckett | 137—625.69 |
| 3,287,022 | 11/1966 | Soechting | 277—188 |

FOREIGN PATENTS

| | | |
|---|---|---|
| 1,351,107 | 12/1963 | France. |
| 763,187 | 12/1956 | Great Britain. |

LAVERNE D. GEIGER, *Primary Examiner.*

JEFFREY MEDNICK, *Assistant Examiner.*

U.S. Cl. X.R.

277—206, 211, 225; 137—625.69